United States Patent Office 2,803,315
Patented Aug. 20, 1957

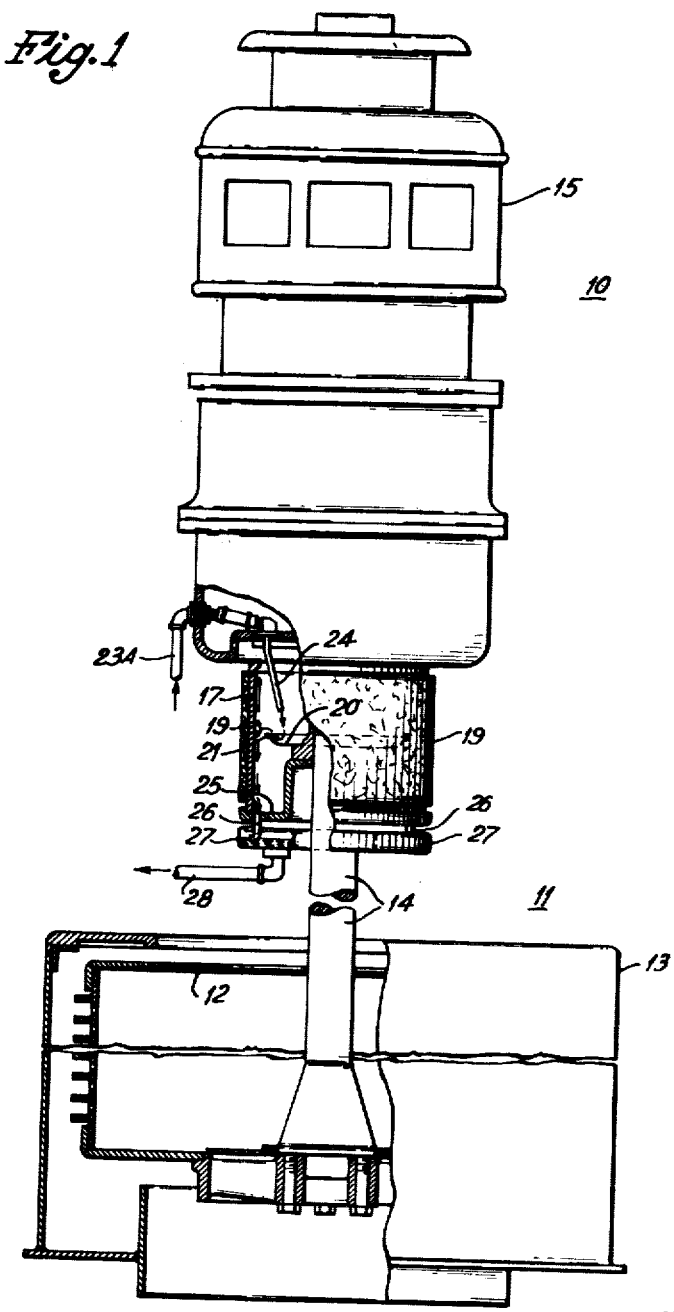

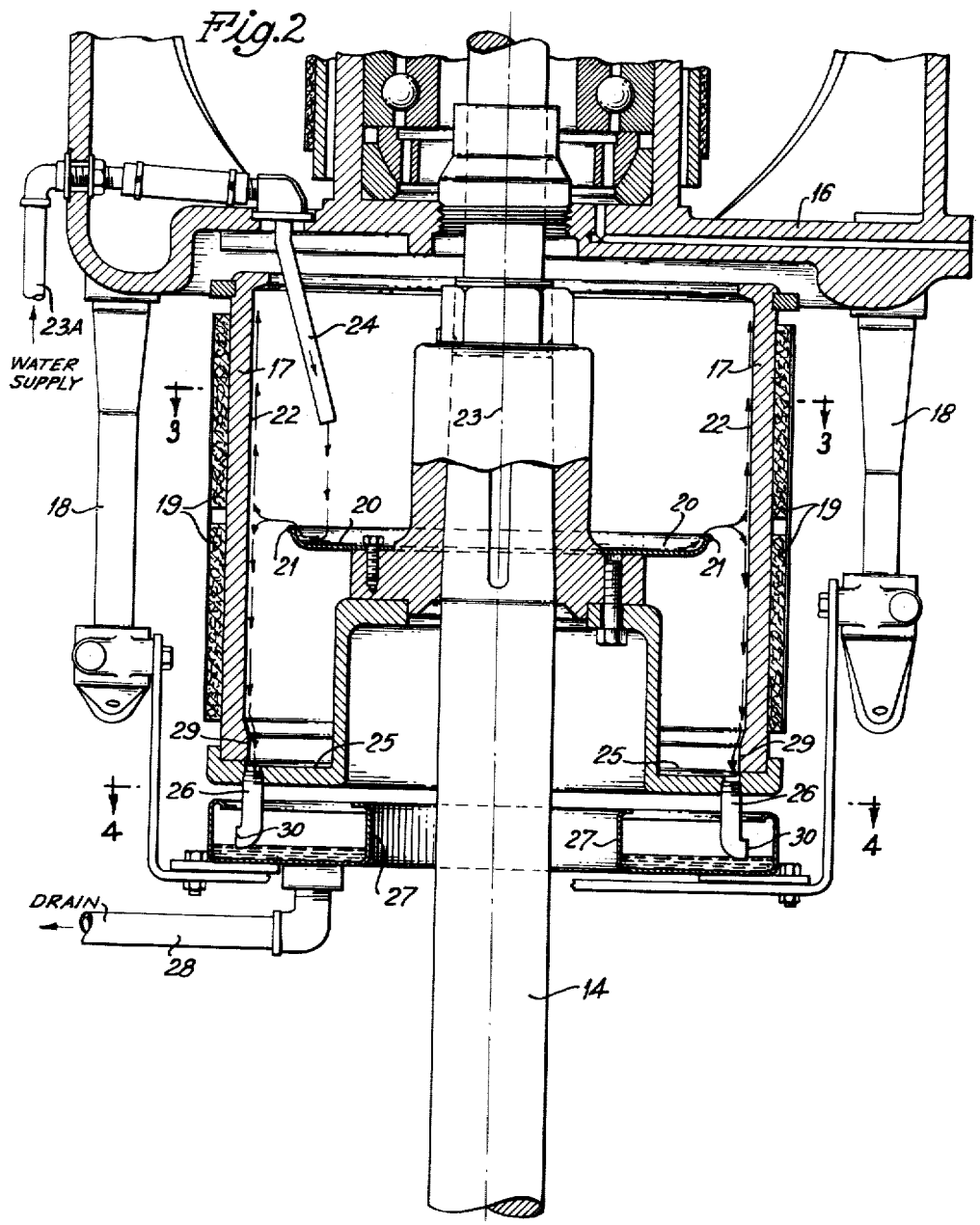

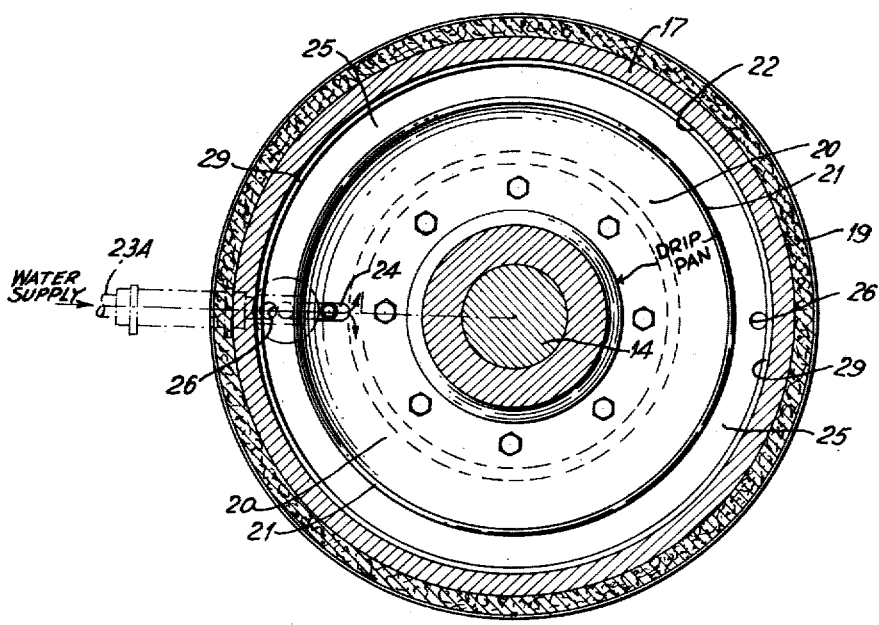
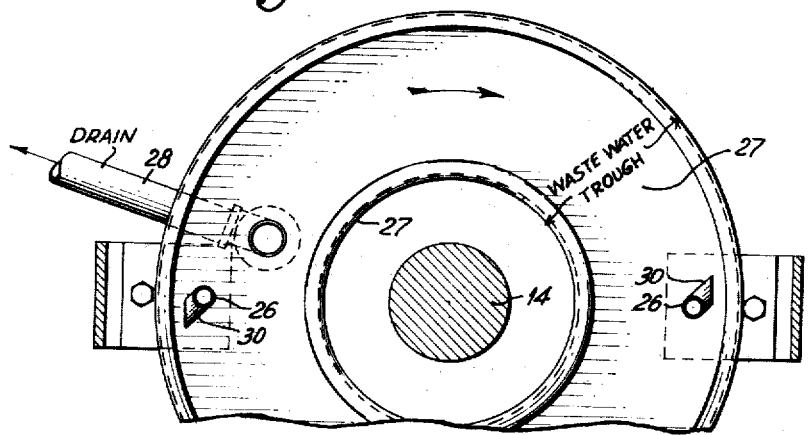

2,803,315

WATER COOLED BRAKES

Alexander H. McPhee, Plandome Heights, N. J., and Thomas H. Reid, Brooklyn, N. Y., assignors to Hepworth Machine Company, Inc., Long Island City, N. Y., a corporation of New York Application March 11, 1955, Serial No. 493,648

7 Claims. (Cl. 188—264)

This invention relates to the cooling of brake drums and more particularly to the water cooling of brakes. As a specific example, the invention is directed to the water cooling of brake drums which are attached to centrifugal machines and the like.

Various arrangements for the cooling of the brakes of centrifugal machines, such as those used in the processing of sugar, have been utilized heretofore. A typical machine of this type, with its load, weighs over a ton and it rotates at a normal operating speed of about 1800 R. P. M. As every few minutes it must be brought from this speed to complete rest within a very short time, there is a tremendous generation of heat in the application of a friction brake to a brake drum revolving with the machine. In order to water-cool such a brake drum, it has been customary to apply cooling water to the interior of the drum. Such water has heretofore been applied during the period between the starting of the machine in its operating cycle and the application of the friction brake, or during the period the brake is being applied. Each of these structures utilizing the intermittent application of cooling water has the disadvantage that there is wear and tear on the valves controlling the flow of water to the brake drums. Failure of the valves to function properly constitutes a serious hazard since if the cooling water is interrupted during the cycle and a brake drum fails to receive water it may seriously overheat and when the flow of cooling water is later restored the overheated drum could crack and fly apart under the action of centrifugal force. This has actually been known to happen in several instances.

It is an object of the present invention to overcome the disadvantage just described.

It is another object to provide a brake cooling method and means for centrifugal machines which features the continuous flow of cooling liquid.

These and related objects are attained in accordance with the invention by providing, within the brake drum of a centrifugal machine, an annular drip pan which holds a reservoir of cooling water. When the machine is at rest, the water from an in-put pipe fills up the drip pan and all the balance passes out through a drain pipe. As water is cheap and that which drains off can be used again, there is no serious expense encountered by the continual flow of water and there is a definite saving on valve wear-and-tear which would take place were the water to be cut on and off every few minutes of every working day. After the machine starts operating, the water in the drip pan is thrown by centrifugal force against the inside of the brake drum and walls up there to a certain extent. The thickness of the cooling water wall is determined by the thickness of the inner lip at the bottom of the drum and is purposely held to a minimum to correspond to approximately the volume of water that must be evaporated to absorb all of the kinetic energy given up by the machine during braking. The heated water flows down the side of the drum and out the drain pipe and it is continually being replaced by water from the drip pan. In the wall of cooling water the hot water, being lighter, will be displaced toward the center of rotation or the inner surface of the water wall by the relatively heavier incoming cool water, and hence will be drawn off first as the water wall thickness exceeds the thickness of the lower internal lip. No scoop to remove excess water is required.

The invention will be more readily understood by referring to the following description taken in connection with the accompanying drawings forming a part thereof, in which:

Fig. 1 is a view, in elevation and partial section, of a preferred embodiment of the invention;

Fig. 2 is an enlarged view of a portion of the arrangement of Fig. 1 showing the brake drum and the water cooling means therefor;

Fig. 3 is a horizontal section taken in a plane through line 3—3 of Fig. 2; and

Fig. 4 is a horizontal section taken in a plane through line 4—4 of Fig. 2.

Referring more specifically to the drawings, Fig. 1 shows, by way of example, for purposes of illustration, a sugar centrifugal arrangement 10 employing water cooled braking in accordance with the invention.

The assembly 10 includes a centrifugal machine 11 provided with a rotating basket 12 for the sugar-bearing material mounted within a curb or casing 13, and a spindle 14 attached to the basket. The basket 12 is driven by any suitable means such as, for example, an electric motor 15. The motor is supported by a superstructure 16 (see Fig. 2) from which the shaft 14 and the basket 12 are suspended so that the centrifugal machine 11 may rotate freely within its casing. It is obvious that the invention is by no means confined to electrically driven centrifugals.

Surrounding the shaft 14 is a brake drum 17 supported by support members 18 (see Fig. 2) from the superstructure 16. Brake bands 19 are positioned on the outside of the drum 17 and are applied thereto during the braking of the machine by any convenient means (which have not been shown for simplicity of the drawings).

While the bands are being applied to the drum 17, the latter gets very hot and much heat must be removed in a very short time to prevent premature wear of the brake drum and excessive consumption of brake lining. To provide sufficient water very quickly and to continue the application of cool water as long as it is needed, there has been provided, in accordance with the invention, a drip pan 20. Preferably the pan is of annular shape and has an upturned rim or edge 21. In order for the water to "wall up" over the whole inside surface 22 of the drum 17 when the water is needed, the drip pan 20 is positioned so that it surrounds the longitudinal axis 23 of the drum 17 at a point near the center thereof. The capacity of the drip pan 20 is proportioned to hold approximately the same amount of water as the volume of water in the water wall.

Water from a convenient supply pipe 23A is applied to the interior of the machine 11 and emerges into the interior of the drum through an input pipe 24 which is positioned above and directed toward the drip pan 20. The water is applied at all times including the periods while the basket 12 is running during the sugar-centrifuging portion of the cycle, during the braking portion thereof, and during the periods when the machine is being loaded with magma and being discharged of the dried sugar crystals.

Consider first a time when the machine is at rest. Water from the pipe 24 fills the drip pan 20 until it flows over the rim 21. The surplus flows by gravity to the annular trough 25 in the bottom of the drum 17. Suitable outlet pipes 26 positioned near the outer circumference of the drum permit the overflow water to pass into a waste water trough 27 below the drum 17 which has a drain pipe 28. The ends 30 of the outlet pipes 26 are cut on a bias and the pipes are slanted against the direction of rotation to make more efficient the outflow of water. If desired, the water in the pipe 28, after cooling if it is warm, may be fed into the pipe 23A so that there is no waste of water by the continuous flow.

Now if the machine is running, centrifugal force will cause water from the drip pan 20 to be thrown against the inside wall 22 of the drum 17 where it "walls-up" against the whole surface thereof, in a manner well-known to workers in the centrifugal art. As mentioned before, the thickness of the cooling water wall is determined by the thickness of the inner lip 29 at the bottom of the drum 17 and this is purposely held to a minimum to correspond to approximately the volume of water that must be evaporated to absorb all the kinetic energy given up by the machine during braking. As water continues to flow from the pipe 24, the pan 20 tends to keep on throwing water toward the drum wall 22 to replace the heated water which flows down the drum wall to the trough 25. Thus the drum is continually cooled during the running and braking stages. All surplus water is quickly and easily removed so there is no flooding. After the machine is stopped, the drip pan stores up to capacity and is ready for the next rotating part of the cycle. The cooling method and means described above has proven to be very efficient in practice.

It is obvious that various changes in the above-described embodiment can be made without departing from the spirit or scope of the invention, as indicated in the claims.

What is claimed is:

1. A water cooled braking means for a cyclically operated centrifugal machine comprising a rotating brake drum and separated therefrom, means within said brake drum for storing while said drum is at rest a predetermined amount of cooling water, means for removing from said drum all water above said predetermined amount, and means for continually introducing cooling water to said storing means both while said machine is rotating and the water walls up against the drum and while the machine is at rest.

2. A water cooled braking means for a cyclically operated centrifugal machine comprising a rotating brake drum, a drip pan within and separated from said brake drum and coaxially disposed therewith, means for continually introducing cooling water to said drip pan both while said machine is rotating and while it is at rest, and overflow means for carrying off any cooling liquid which cannot be retained by said drip pan while said machine is at rest and that which is not walled up within said brake drum during the rotation thereof.

3. A water cooled braking means for a cyclically operated centrifugal machine comprising a rotating brake drum, a drip pan within and separated from said brake drum and coaxially disposed therewith, means for continually introducing cooling water to said drip pan both while said machine is rotating and while it is at rest, and overflow means for carrying off any cooling liquid which cannot be retained by said drip pan while said machine is at rest and that which is not walled up within said brake drum during the rotation thereof, said drip pan being of annular shape.

4. A water cooled braking means for a cyclically operated centrifugal machine comprising a rotating brake drum, a drip pan within and separated from said brake drum and coaxially disposed therewith, means for continually introducing cooling water to said drip pan both while said machine is rotating and while it is at rest, and overflow means for carrying off any cooling liquid which cannot be retained by said drip pan while said machine is at rest and that which is not walled up within said brake drum during the rotation thereof, said drip pan being of annular shape with an upturned rim.

5. A water cooled braking means for a cyclically operated centrifugal machine comprising a rotating brake drum, a drip pan within and separated from said brake drum and coaxially disposed therewith, means for continually introducing cooling water to said drip pan both while said machine is rotating and while it is at rest, and overflow means for carrying off any cooling liquid which cannot be retained by said drip pan while said machine is at rest and that which is not walled up within said brake drum during the rotation thereof, said drip pan being positioned so that it surrounds the longitudinal axis of said drum at a point near the center thereof.

6. A water cooled braking means for a cyclically operated centrifugal machine comprising a rotating brake drum, a drip pan within and separated from said brake drum and coaxially disposed therewith, means for continually introducing cooling water to said drip pan both while said machine is rotating and while it is at rest, and overflow means for carrying off any cooling liquid which cannot be retained by said drip pan while said machine is at rest and that which is not walled up within said brake drum during the rotation thereof, said overflow means including a pipe positioned farther from the longitudinal axis of said drum than is the outer edge of said drip pan and below the drum.

7. The method of cooling a brake drum of a centrifugal machine which provides continually supplying cooling liquid to a reservoir within and separated from the drum from which it is applied by centrifugal force alone to the inside of the drum while the machine is in motion.

References Cited in the file of this patent

UNITED STATES PATENTS

| | | |
|---|---|---|
| 1,613,680 | Timbs | Jan. 11, 1927 |
| 1,713,502 | Steps | May 14, 1929 |
| 2,096,341 | Roberts | Oct. 19, 1937 |
| 2,098,490 | Fitzpatrick et al. | Nov. 9, 1937 |
| 2,176,440 | Tholl | Oct. 17, 1939 |

UNITED STATES PATENT OFFICE

CERTIFICATE OF CORRECTION

Patent No. 2,803,315                                                            August 20, 1957

Alexander H. McPhee et al

It is hereby certified that error appears in the above numbered patent requiring correction and that the said Letters Patent should read as corrected below.

In the grant, lines 1 and 2, address of first inventor, for "Plandome Heights, New Jersey" read -- Plandome Heights, New York --; in the heading to the printed specification, line 3, for "Plandome Heights, N. J." read -- Plandome Heights, N. Y. --.

Signed and sealed this 11th day of November 1958.

(SEAL)
Attest:

KARL H. AXLINE
Attesting Officer

ROBERT C. WATSON
Commissioner of Patents